United States Patent [19]

Merges et al.

[11] Patent Number: 4,501,469

[45] Date of Patent: Feb. 26, 1985

[54] MIRROR STRUCTURE FOR REFLECTING AND CONCENTRATING RADIATION ENERGY

[75] Inventors: Veit Merges, Putzbrunn; Kurt Hummel, Munich, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 398,108

[22] Filed: Jul. 14, 1982

[30] Foreign Application Priority Data

Jul. 23, 1981 [DE] Fed. Rep. of Germany ....... 3130471

[51] Int. Cl.³ .............................................. G02B 7/18
[52] U.S. Cl. ..................................... 350/611; 350/613
[58] Field of Search ............... 350/292, 299, 310, 295, 350/289; 353/3; 126/424; 248/466, 475 R, 475 B

[56] References Cited

U.S. PATENT DOCUMENTS

| | | | |
|---|---|---|---|
| 2,707,903 | 5/1955 | Trombe | 350/295 |
| 2,968,033 | 1/1961 | Kreitzberg | 350/292 |
| 2,987,961 | 6/1961 | Cotton et al. | 350/292 |
| 3,009,391 | 11/1961 | Zagieboylo et al. | 350/292 |
| 3,401,390 | 9/1968 | Braccini et al. | 350/292 |
| 3,528,730 | 9/1970 | Saxon | 350/292 |
| 4,245,895 | 1/1901 | Wildenrotter | 350/292 |

FOREIGN PATENT DOCUMENTS

| | | |
|---|---|---|
| 2738857 | 3/1979 | Fed. Rep. of Germany . |
| 2901002 | 7/1979 | Fed. Rep. of Germany . |
| 2406214 | 5/1979 | France . |
| 2411648 | 7/1979 | France . |

Primary Examiner—Jon W. Henry
Attorney, Agent, or Firm—W. G. Fasse; D. H. Kane, Jr.

[57] ABSTRACT

Mirror structures for reflecting and concentrating radiation energy, so-called heliostats, comprise a rotatably pivoted supporting framework made of flexurally stiff supporting members (12, 13, 14), with single mirrors adjustably attached thereto. In order to be able to use thinner, lighter, not pre-bent, yet flexibly adjustable single mirrors, essentially flat planar carrying frames (1, 2, 4) are attached to the supporting framework, preferably by way of three-point connections (5). Several flexible, smaller individual mirrors (6) are mounted on each of these carrying frames, with the aid of axially adjustable pins distributed over the mirror plane.

8 Claims, 3 Drawing Figures

MIRROR STRUCTURE FOR REFLECTING AND CONCENTRATING RADIATION ENERGY

CLAIM TO PRIORITY

The present invention relates to German Patent Application No. P 31 30 471.0, filed in the Federal Republic of Germany on July 23, 1981. The priority of the German filing date is claimed for the present application.

BACKGROUND OF THE INVENTION

The invention relates to a structure for reflecting and concentrating radiation energy, having a rotatably supported framework comprising flexurally stiff supporting members, with individual mirrors adjustably attached thereto.

Such a mirror structure is known from (DE-OS) No. 2,802,914, in which each individual mirror is attached by means of elastic securing elements to at least two parallel carrying rails or bars, of which several in turn are each mounted to a cross support member. Several such cross members, together with a rotatably supported central mast and the above mentioned carrying rails, form a supporting framework, which must already posess a certain inherent flexural stiffness. Although (DE-OS) No. 2,802,914 mentions that this supporting framework must exhibit a certain flexibility with respect to bending or flexural loads, there is on the other hand, the need to ensure that the focusing of the individual mirrors is not overly impaired or hampered by wind loads, for instance. This is especially evident in the embodiment of FIG. 2, in which the individual mirrors are each held by only two carrying rails, so that considerable torsional moments are exerted by wind loads on the sections of the cross members extending from both sides of the central mast. Thus, if the cross members were not constructed with a substantial flexural stiffness, the focusing alignment of the individual mirrors would also fluctuate during changing wind loads. The manner in which the individual mirrors are attached to the supporting framework now requires that they are constructed as rigidly and dimensionally stable as possible. This applies to both the forwardly vaulted individual mirrors of the embodiment according to FIG. 1 and to the plane individual mirrors of FIG. 2. If the mirrors were not rigid, they could not retain the desired surface shape during wind loading. Rigid mirrors however, must be constructed with a certain thickness and corresponding weight, which then affects the weight of the entire framework.

Besides, a consequence of the construction of the prior art mirror structure is that the possibilities of focusing are very limited. The rigid individual mirrors could be easily tilted, if necessary, in their spacial orientation by adjusting the securing elements. The predetermined surface shape of the rigid single mirrors is not influencable any more. Overall, the prior art mirror structures are characterized by a relatively high total weight and a lack of flexibility in the focusing.

OBJECTS OF THE INVENTION

Therefore, it is the aim of the invention to provide a mirror structure of the aforementioned type, which is as light as possible, and which has a high flexibility regarding its adjustment and focusing capabilities.

SUMMARY OF THE INVENTION

This aim is achieved according to the invention, in that the individual mirrors are connected to the supporting framework by means of essentially flat carrying frames which each carry at least one individual mirror and are each attached to the supporting framework at least at three points. The individual mirrors are each attachable to the carrying frames by means of a number of axially adjustable, flexurally elastic pins.

Thus, the individual mirrors are no longer directly secured to the supporting framework. Rather, carrying frames are arranged between the mirrors and the supporting framework. Each carrying frame preferably carries several individual mirrors, which in turn are secured to the carrying frame at a number of points. Now, for example, the prior art individual mirror is replaced by a carrying frame, which carries several considerably smaller individual mirrors. This structure offers the possibility of using comparitively very thin and flexible mirrors which may then be brought into the desired geometrical surface shape by varying the axial adjustment of numerous pins, which are distributed evenly over the surface. This is easily achievable by means of jigs or templates. Initially, the carrying frames may be torsionally yielding, but must be so constructed that, after they have been secured to the torsionally stiff supporting framework, they cannot considerably change their shape anymore due to any occurring loads. Because of the relatively light weight of the individual mirrors and of the carrying frame, the supporting framework may be dimensioned for a smaller weight load. Thus, a lessening of the total weight of the mirror structure results, even though additional carrying frames are present between the single mirrors and the supporting framework.

The pins, which serve for securing as well for focusing the single mirrors, according to an advantageous embodiment of the invention, on the one hand, are axially adjustably supported by mounting elements which are attached to the respective carrying frames. On the other hand, the pins are insertable into the socket fixtures, which comprise defined stop surfaces and which are attached to the back side of the single mirrors. The pins may be axially adjusted in the mounting elements by means of an adjustment jig or template so that the desired surface shape of the flexible individual mirrors results when these mirrors are pushed onto the pins until the ends of the pins strike the stop surface of the socket fixtures. The axial direction thereby corresponds to the axial orientation of the pins and extends perpendicularly to the plane defined by the carrying frame. It has proved to be practical to use flexurally elastic pins. Then, varying thermal expansions of the mirrors and carrying frame may be easily compensated by the pins in that these pins correspondingly bend. The same holds true for unavoidable tolerances in the positioning of the socket fixtures and in the respective mounting elements.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
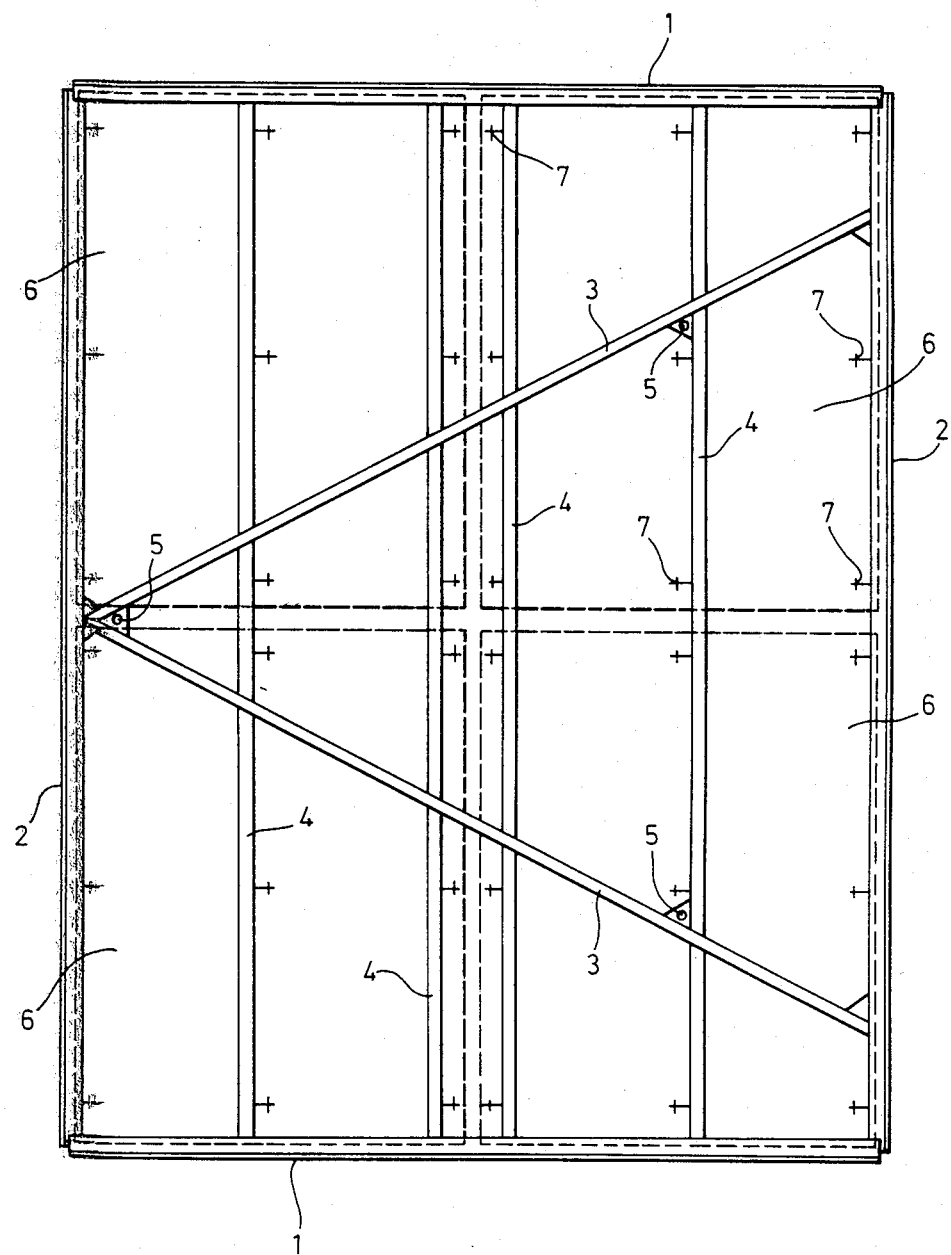
FIG. 1 is a plan view of a carrying frame with four mounted individual mirrors.

FIG. 1 shows, in a much simplified form, a carrying frame carrying four rectangular individual mirrors 6 shown in dashed lines. The carrying frame comprises outer bars or rails 1, 2 which define its rectangular shape, and inner rails 4 which form the reinforcement or bracing. Two support struts or rails 3 are attached to and run between the longitudinal outer rails 2, at an angle to each other. The rails 2, 3, and 4 are U-shaped in cross-section, with flanges oriented in parallel with the plane of the drawing. Both support rails 3 have a larger profile height than the inner rails 4 and comprise openings at intersections through which the rails 4 pass. All the rails 1, 2, 3 and 4 are made out of hot galvanized sheet steel, for instance.

Figure 3:
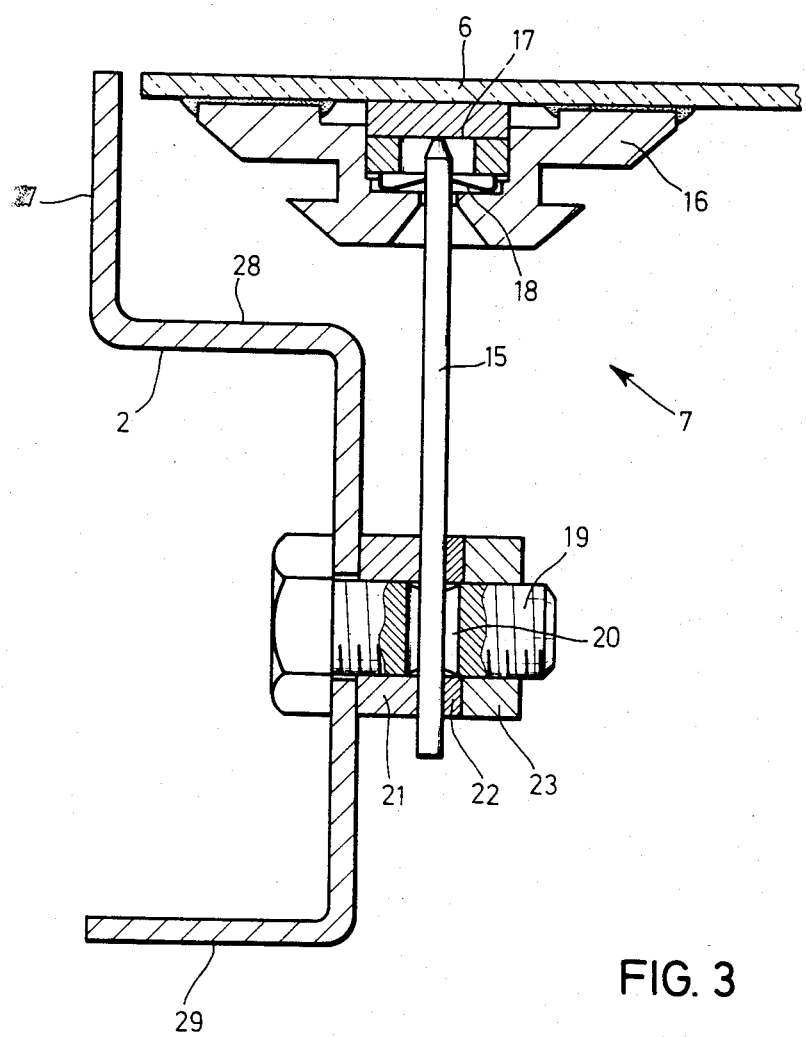
FIG. 3 is a socket fixture for a flexible pin, as well as the accompanying mounting element.

The support rails 3 are not only connected to the outer rails 2, but also to one of the inner rails 4. The carrying frame is attached at three points 5 to the supporting framework, which is not shown in FIG. 1. Four rectangular individual mirrors 6 shown by dashed lines are mounted on the carrying frame, by mounting means indicated at the locations 7. The structure of these mounting means 7 is shown in FIG. 3. The mounting means comprise flexible pins which are axially adjustable, that is prependicularly to the plane of the drawings. The pins serve for bending the flexible individual mirrors into the desired surface shape. If, for instance from a top view a concave surface is to be produced, then the center pin, of the nine pins allocated to each individual mirror, would be adjusted downwardly the most perpendicularly to the plane of the drawing. The remaining eight pins project relatively more, the further away they are from this central pin. Through proper axial adjustment of the pins, a very good approximation of a paraboloid shape may be achieved. However, the curvature of the rectangular individual mirrors would generally be relatively small, because the mirror structure is particularly intended for use in heliostat fields, in which large focal lengths occur due to the relatively large distance from the central radiation receiver.

The upper flanges of the U-profile of the outer rails 2 are bent upwards at their outer edges perpendicular to the plane of the drawing, whereby protection is provided for the corresponding edges of the individual mirrors against lateral impacts, for instance. The bent up rims simultaneously increase the stiffness of the rails, which already have a certain inherent stiffness because of the U-profile anyway. Both outer rails 1 are each constructed of two L-profiles, of which the legs lying in parallel to the drawing plane on the one hand, reach under the U-profiles of the rails 2, while the other one lies on top thereof. The legs of the L-profiles, which are of different lengths and are orientated perpendicular to the drawing plane, lie on top of one another and form a rim extending vertically up similarly to the rails 2. The edges of the single mirrors are thus protected from all four sides.

The individual mirrors may be made of thin conventional float glass and provided with a protective lacquer coating on the back side. Mirrors of this type exhibit a reflection coefficient of over 80%. An increase in reflectivity to over 90% is achievable with double-glass mirrors, which are, however, more expensive. Besides saving weight, the use of such relatively thin and flexible mirrors has the advantage, among others, that the danger of glass breakage due to temperature variations is reduced.

The use of axially adjustable pins is advantageous in so far as the focus adjustment remains even if a mirror should break and have to be replaced with a new one. Even the focusing procedure necessary before the first mounting of the single mirrors may be carried out without danger of glass breakage because appropriate templates may be used.

Figure 2:
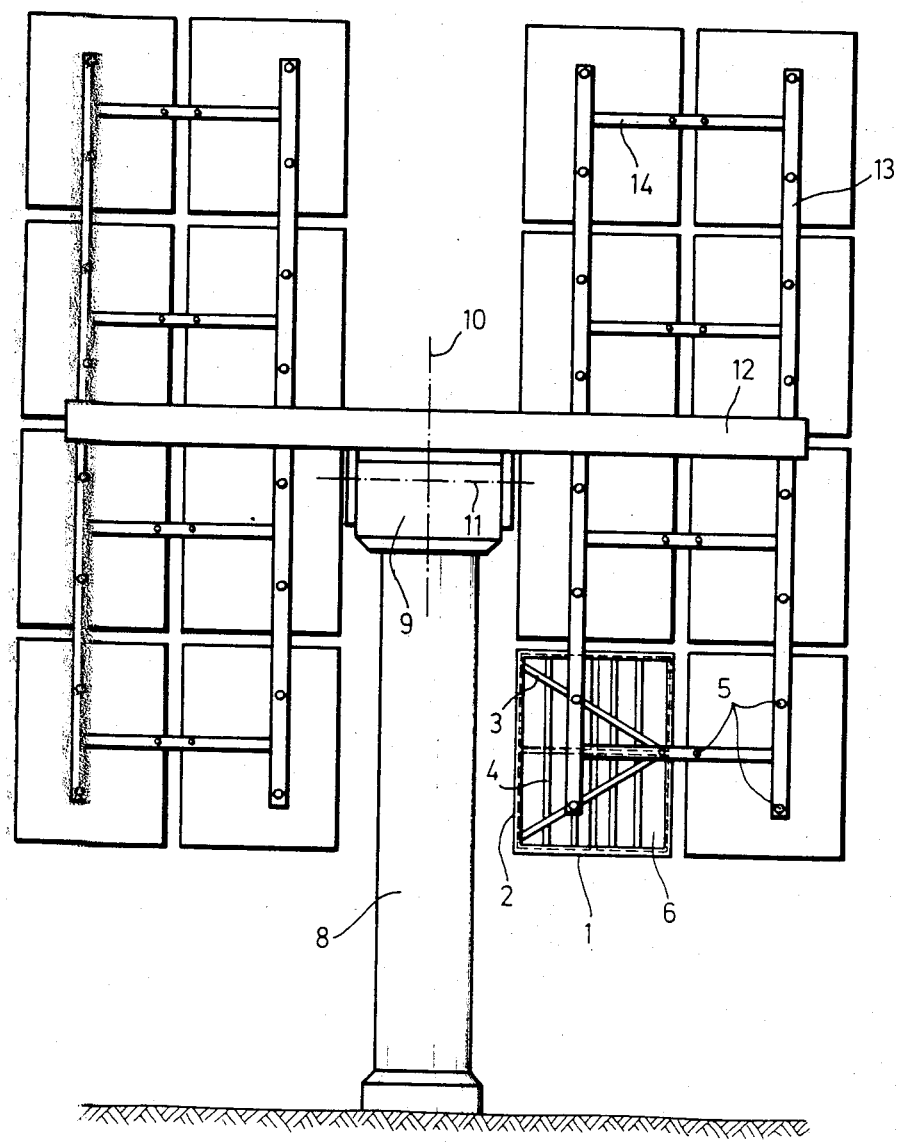
FIG. 2 shows a supporting framework with carrying frames mounted thereon.

FIG. 2 shows, in a rather schematic manner, a so-called heliostat which carries a mirror structure according to the invention. The mirror structure is shown from the back side, so that the reflecting surfaces of the individual mirrors are facing away from the viewer. A drive mechanism 9 which is rotatable around two axes 10, 11, extending perpendicularly to each other, is attached to a carrying column 8, for moving the mirrors to follow the sun.

The drive mechanism 9 carries a cross beam 12, to which in turn, a total of four longitudinal stringers 13 are attached. Each pair of these stringers 13 is interconnected by a total of four carrying rails 14. The cross beam 12, the stringers 13, and the carrying rails 14 together form a rotatably supported, flexurally stiff supporting framework. The carrying frames are attached to this framework or, more precisely, attached to the carrying rails 14 and to the stringers 13 by means of three point supports 5. The carrying frames comprise outer rails 1, 2 and inner rails 4 as well as supporting struts or rails 3. Four individual mirrors 6 are mounted on each of these carrying frames. This is only shown in detail on one of the total of sixteen carrying frames for reasons of better overall clarity. The frame structure shown corresponds to the one shown in FIG. 1.

FIG. 3 shows schematically a possible embodiment of the mounting means by means of which the individual mirrors are attached to the carrying frames. The illustration corresponds to a section through the left one of the two outer rails 2 shown in FIG. 1, as well as through a respective mounting means. The rail 2 has a U-shaped profile in cross-section, with two parallel flanges 28 and 29. The upper flange 28 adjoins a perpendicular bent-up rim 27. A socket fixture 16 is attached, for instance glued, to the bottom side of the single mirror 6. A fitting piece comprising a defined stop surface 17 is inserted in a suitable opening of this socket fixture. A slotted clamping disk 18 is also set into this opening. A screw or bolt 19 having a bored hole 20, is inserted into a hole in the rail 2 and is secured by a nut 21. A flexible pin 15 is inserted into the bored hole 20 and locked by a shim or washer 22 and another nut 23. The mirror 6 with the socket fixture 16 is pushed onto the pin until the end thereof strikes the stop surface 17. Through such mounting, the end of the pin 15 reaches into the slot of the clamping disk 18 which provides a friction fit with a determined holding force so that the pin 15 cannot simply be pulled out again. Thus, the mirror is given a definite position at the respective mounting point.

The socket fixture 16 may be manufactured of die cast aluminum or a man-made material such as plastics, for instance. The flexible pin 15 should be high-strength stainless steel. To release the pin 15 from the slot of the clamping disk 18 against the holding force of the friction fit by the clamping disk 18, a properly shaped special tool must simply be pushed into the central opening of the socket fixture so as to apply an upward pressure on the rim of the slot. The removal of the mirrors is thus very simple, as is an eventual desired readjustment of the axially adjustable pins and the reinstallment of the single mirrors.

As is shown in FIG. 3, the pin 15 is held in the socket fixture 16 simply by the rim of the clamping disk 18. Furthermore, the central inlet opening of the socket fixture, into which the pin 15 is inserted, comprises a funnel-shaped enlargement. This construction brings about that the pin is secured in the socket fixture almost as if by a ball and socket joint, whereby the pin cannot transmit substantially any force moments to the mirror.

The bored hole shown at 20 in FIG. 3 could be replaced by a slot lying in an axial plane. The pin 15 would be pushed into this slot, which would then be pressed together by means of a clamping nut or screw cap.

Although the invention has been described with reference to specific example embodiments, it will be appreciated that it is intended to cover all modifications and equivalents within the scope of the appended claims.

We claim:

1. In a mirror structure for reflecting and concentrating radiation energy, having a supporting framework including flexurally stiff supporting members and mirror means adjustably attached to said framework, the improvement wherein said mirror means comprise at least one flexible mirror, said mirror structure further comprising means for connecting said flexible mirror to said framework, said connecting means comprising at least one substantially planar carrying frame, first securing means operatively securing said carrying frame to said supporting framework at least at three points (5), and second securing means for adjustably and removably securing said flexible mirror to its planar carrying frame, said second securing means comprising a pin (15), mounting means (19, 20, 21, 22, 23) for mounting one end of said pin in an axially adjustable manner to said planar carrying frame, and a fixture (16) including a defined stop surface (17) attached to a backside of said flexible mirror, said fixture (16) including friction fit means (18) in which the other end of said pin is inserted and held with a force determined by said friction fit means, whereby any vaulting of said flexible mirror is determined by inserting the other end of said pin into said fixture to an extent permitted by said defined stop surface (17).

2. The mirror structure of claim 1, wherein said fixture (16) comprises a socket with a funnel shaped inlet opening for receiving said pin, and wherein said friction fit means (18) comprise a slotted clamping disk (18) into which said pin is insertable through said funnel shaped inlet opening.

3. The mirror structure of claim 1, wherein said mounting means comprise a bored hole (20) or slot in which said one end of said pin is adjustably clampable.

4. The mirror structure of claim 1, wherein said pin (15) is flexible.

5. The mirror structure of claim 1, wherein said planar carrying frame comprises rails (1, 2, 4) having a U-shaped profile, of which both flanges (28, 29) are oriented in parallel to a plane defined by the corresponding planar carrying frame.

6. The mirror structure of claim 1, wherein said planar carrying frame comprises outer rails (1, 2) which define the frame shape, and inner rails (4) which serve as reinforcements between the outer rails.

7. The mirror structure of claim 6, wherein said outer rails (1, 2) comprise rims (27) bent up perpendicularly to the plane of the carrying frame.

8. The mirror structure of claim 6, further comprising support struts (3) running at an angle to each other between said outer rails (1, 2) and being attached to said outer rails (1, 2) of said planar carrying frame, said struts comprising openings for the inner rails (4) which intersect said struts, said struts being connected to said inner rails at predetermined intersections and/or to connection points of said outer rails with said supporting framework.

* * * * *